United States Patent
Graf et al.

(10) Patent No.: US 6,208,981 B1
(45) Date of Patent: Mar. 27, 2001

(54) CIRCUIT CONFIGURATION FOR CONTROLLING A RUNNING-GEAR OR DRIVE SYSTEM IN A MOTOR VEHICLE

(75) Inventors: Friedrich Graf, Regensburg; Werner Hauptmann, München, both of (DE)

(73) Assignee: Siemens Aktiengesellschaft, Munich (DE)

(*) Notice: Subject to any disclaimer, the term of this patent is extended or adjusted under 35 U.S.C. 154(b) by 0 days.

(21) Appl. No.: 09/013,298

(22) Filed: Jan. 26, 1998

Related U.S. Application Data (63) Continuation-in-part of application No. PCT/DE96/01113, filed on Jun. 24, 1996.

(30) Foreign Application Priority Data

Jul. 26, 1995 (DE) .............................................. 195 27 323

(51) Int. Cl.[7] .............................. G06N 5/04; G06N 3/02; G06N 7/02
(52) U.S. Cl. ....................... 706/2; 706/1; 706/2; 706/16; 706/25; 706/23
(58) Field of Search .................................. 706/2, 16, 25, 706/23; 431/12, 14; 701/27, 59, 40, 44, 57, 77, 98, 106

(56) References Cited

U.S. PATENT DOCUMENTS

| | | |
|---|---|---|
| 5,089,963 | 2/1992 | Takahashi . |
| 5,410,477 * | 4/1995 | Ishii ........................................ 701/48 |
| 5,687,082 * | 11/1997 | Rizzoni .................................. 701/111 |
| 5,821,412 * | 10/1998 | Bryant et al. ........................ 73/117.3 |
| 5,971,747 * | 10/1999 | Lemelson et al. ...................... 431/12 |
| 5,993,194 * | 11/1999 | Lemelson et al. ...................... 431/14 |

FOREIGN PATENT DOCUMENTS

| | | |
|---|---|---|
| 42 09 150 A1 | 9/1992 | (DE) . |
| 43 37 164 A1 | 5/1994 | (DE) . |
| 06123706 * | 5/1994 | (JP) ................................. 250/363.02 |

OTHER PUBLICATIONS

Holzmann, H.; Halfmann, C.; Isermann, R., Representation of 3–D mappings for automotive control applications using neural networks and fuzzy logic, Control Applications, 1997., Proceedings of the 1997 IEEE International Conference on, Oct. 5–7, 1997, Pag.*

Harrison, G.A.; Taylor, F.J,. Gas turbine vibration analysis with fuzzy ART neural network, Neural Networks, 1999. IJCNN '99. International Joint Conference on, vol.: 6, Jul. 10–16, 1999 , pp. 4319–4323 vol 6.*

(List continued on next page.)

*Primary Examiner*—Mark R. Powell
*Assistant Examiner*—Wilbert Starks
(74) *Attorney, Agent, or Firm*—Herbert L. Lerner; Laurence A. Greenberg; Werner H. Stemer (57) ABSTRACT

Motor vehicle sensor signals are evaluated by a fuzzy system, which generates control signals for a system device of the motor vehicle—for example an automatic transmission, active suspension, speed stabilization, power-steering assistance, or traction control. The fuzzy system is connected to a neural network, which evaluates the sensor signals and reference data from a recording of driving data of the motor vehicle. The neural network optimizes the rule base of the fuzzy system. During a driving operation, the fuzzy system generates on-line signals categorizing the respective driving situation, and thus makes possible intelligent, time-adaptive, driving-situation-dependent control. The fuzzy system and the neural network each contain a classification system which can be reciprocally converted by a correspondence-maintaining bidirectional transformation.

7 Claims, 5 Drawing Sheets

OTHER PUBLICATIONS

McNeil, A.R.; Sarkodie–Gyan, T., A neural network based recognition scheme for the classification of industrial components, Fuzzy Systems, 1995. International Joint Conference of the Fourth IEEE International Conference on Fuzzy Systems and The Second Int, Mar. 1995.*

Nishimori, K.; Hirakawa, S.; Hiraga, H.; Ishihara, N., Selection of fuzzy control rules using automatic tuning of membership functions, Fuzzy Information Processing Society Biannual Conference, 1984. Industrial Fuzzy Control and Intelligent Systems Confer, Jan. 1994.*

Ng, Kim C. et al., Multirobot Convoying Using Neuro–Fuzzy Control, Pattern Recognition, 1996, Proceedings of the 13th International Conference on vol.: 3, 1996, pp.: 417–421 vol, Jan. 1996.*

International Publication No. 93/23689 (Danz et al.), dated Nov. 25, 1993.

"Neuronal Nets: absolutely compatible in sample detection" (Kahler), Electronic vol. 10, 1991, pp. 98–104.

* cited by examiner

FIG.9

CIRCUIT CONFIGURATION FOR CONTROLLING A RUNNING-GEAR OR DRIVE SYSTEM IN A MOTOR VEHICLE

CROSS-REFERENCE TO RELATED APPLICATION

This is a continuation of international application Ser. No. PCT/DE96/01113, filed Jun. 24, 1996, which designated the United States.

BACKGROUND OF THE INVENTION

1. Field of the Invention

The invention relates to a circuit configuration for controlling the engine or the drive system in a motor vehicle. The configuration includes a fuzzy system (10) in which sensor signals are evaluated and control signals for the engine or drive system are generated, wherein a drive situation is determined. Adaptive system components, particularly in the areas of running-gear and safety technology, as well as drive management, have become increasingly more important in the automobile industry. Specific equipment or systems in the vehicle, such as automatic transmissions, active suspension and level regulation, or power-steering assistance, are adjusted and controlled by adapting their settings to the respective driving situation.

2. Description of the Related Art

International publication WO 93/23689 describes a control system for shifting an automatic transmission on the basis of fuzzy logic methods. The system takes into account the drive power, fuel consumption, and the effort in setting shifting strategies. The control system thereby reacts to the driving style and the driving state. For this, it needs a relatively large number of different rule sets of fuzzy production rules, which reproduce the knowledge of a human expert and which thus all have to be prescribed by the developer of the control system. This entails considerable effort. In addition, human expert knowledge is also subject to uncertainties here.

SUMMARY OF THE INVENTION

It is accordingly an object of the invention to provide a circuit configuration for controlling a running-gear or drive system in a motor vehicle, which overcomes the above-mentioned disadvantages of the prior art devices and methods of this general type and which allows detecting the respective current driving situation of the motor vehicle, and which is able to learn in machine terms and thus also to elaborate and to improve nonlinear control rules independently.

With the foregoing and other objects in view there is provided, in accordance with the invention, a circuit configuration for controlling a system device in a motor vehicle, comprising:

a fuzzy system receiving sensor signals from the motor vehicle, the fuzzy system being programmed to evaluate the sensor signals, to determine a driving situation, to generate, during a driving operation of the motor vehicle, signals classifying a respective driving situation, and to generate driving-situation-dependent control signals for a system device in the motor vehicle;

a neural network connected to the fuzzy system, the neural network being programmed to evaluate the sensor signals and reference data from a recording of driving data of the motor vehicle, the neural network generating and optimizing the fuzzy system; and a preprocessing circuit connected to the fuzzy system, the preprocessing circuit filtering and smoothing the sensor signals and/or control signals prior to an evaluation thereof in the fuzzy system, and wherein a linkage effects a dimensional reduction of the sensor signals.

In accordance with an added feature of the invention, a signal memory connected to the fuzzy system stores the sensor signals and/or the control signals prior to an evaluation thereof by the fuzzy system.

In accordance with an additional feature of the invention, a database storing video recordings of measurement trips taken by the motor vehicle is provided, and a reference data memory through which data contained in the database are delivered to the neural network.

In accordance with another feature of the invention, the neural network adapts a form and location of membership functions of input and output data, and a rule base of the fuzzy system.

In accordance with a further feature of the invention, the fuzzy system and the neural network have functionally equivalent, respective input and output behavior.

In accordance with a concomitant feature of the invention, the fuzzy system and the neural network each has a classification system, and the classification system of one is convertible into the classification system of the other by a correspondence-maintaining bidirectional transformation.

One advantage of the invention is that it provides a system for detecting the current driving situation in a motor vehicle. The classification system delivers statements about the current driving state in relation to driving dynamics, driving maneuvers and driver behavior, using various sensor data measured continuously in the motor vehicle. This information enables intelligent, time-adaptive, driving-situation-dependent control of various systems in the motor vehicle. The increasing use of such adaptive components in the areas of running-gear and drive systems is already becoming apparent at the present time, and will gain even greater significance in future vehicle generations, since in this way an increase in driving safety, economy and convenience may be achieved.

Further examples of adaptive vehicle systems, for which a driving-situation-dependent control can advantageously be used, are all-wheel steering systems, hybrid drives, so-called intelligent speed control systems and anti-slip control systems.

Other features which are considered as characteristic for the invention are set forth in the appended claims.

Although the invention is illustrated and described herein as embodied in a circuit configuration for controlling a running-gear or drive system in a motor vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
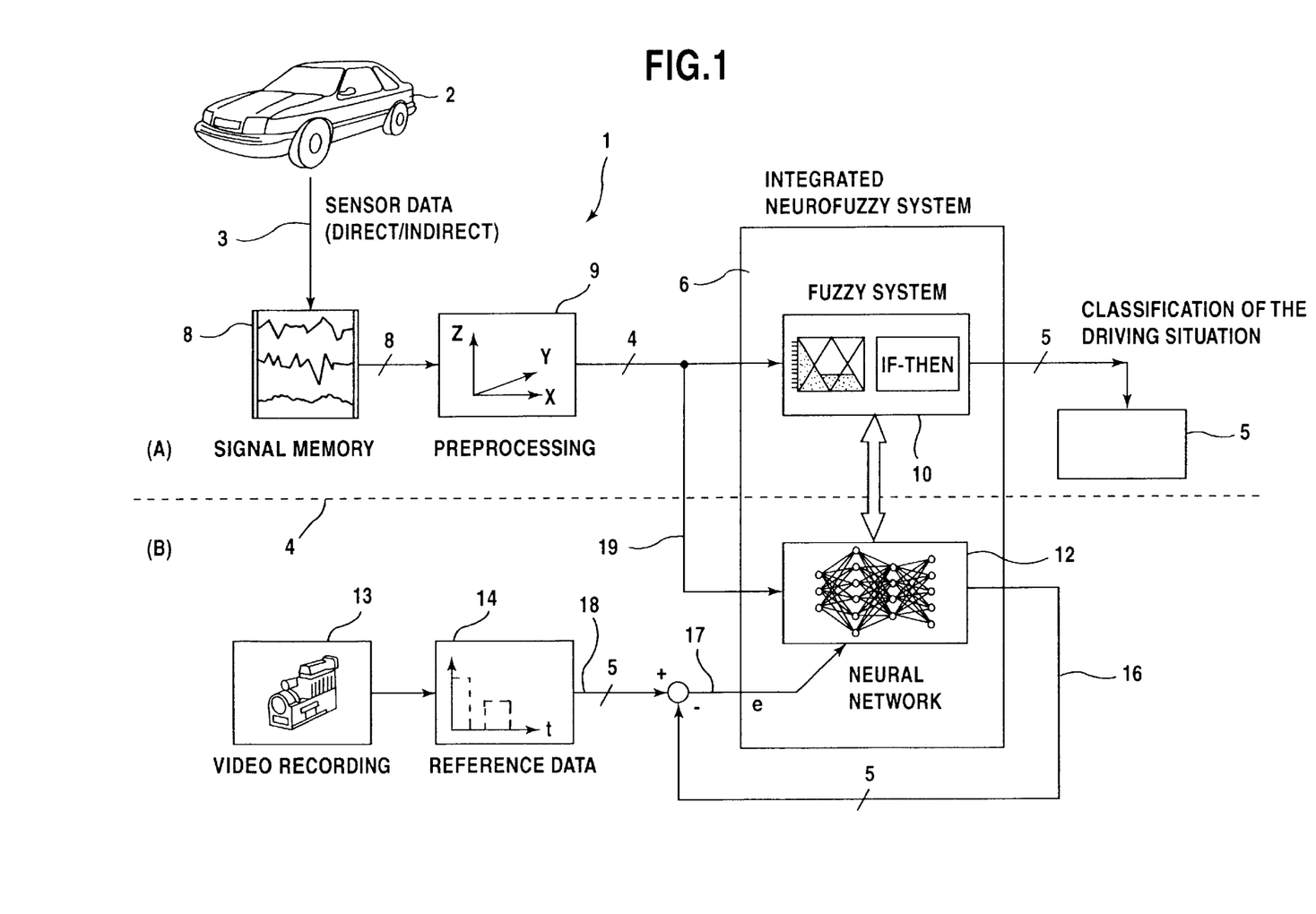
FIG. 1 is a schematic diagram illustrating and overview of the configuration according to the invention.

Referring now to the figures of the drawing in detail and first, particularly, to FIG. 1 thereof, there is seen a circuit configuration 1 (also referred to as controller 1 in the following text). The controller 1 controls one of the above-noted systems or units in a motor vehicle 2. It receives, via signal lines 3, sensor data from sensors throughout the motor vehicle 2. The sensor data can be transmitted directly by various sensors or indirectly—for example following processing in an ABS device. The circuit configuration 1 may be conceptually divided into two partial systems A and B, as indicated in FIG. 1 by a dashed dividing line 4. The partial systems or processing blocks A and B operate essentially independently of each other and are coupled to each other by a core module 6—also referred to as "integrated neurofuzzy system". Output signals from the processing block A pass, as actuating or control signals, to a system device 5 to be controlled (for example to an automatic transmission). The block A has the following components: a signal memory 8, a preprocessing module or circuit 9, and a fuzzy system 10.

The function of the circuit configuration 1 is essentially a symbiosis between the concepts of fuzzy system classification and of neural network processing in a neuro-fuzzy total system. Such a neuro-fuzzy detection or classification process permits, during the design and the development stages of a controller, the common utilization of the properties of fuzzy systems and of neural networks in an integrated system. On the one hand, available expert knowledge can be processed with the aid of linguistically formulated IF-THEN rules (in a fuzzy rule base) and weighted membership functions. On the other hand, the capability of a neural network can be utilized in order to learn nonlinear relationships on the basis of the available, recorded sensor data. The combination of expert knowledge and process data permit a complete picture of the relationships to be drawn up.

Up to twelve different items of sensor information are used as input variables for the circuit configuration 1. These input items are measured continuously in the vehicle and stored in the signal memory 8. The sensors themselves are not illustrated, since they are generally known. Important sensor signals are, for example, the instantaneous speed, the setting of the throttle, the currently engaged gear, the transverse acceleration, and the engine rotational speed of the motor vehicle 2. These so-called primary sensor signals, following preprocessing and a partial fusion in the circuit 9, are input into to the fuzzy system 10 which, using the instantaneous input data, estimates or categorizes the current situation. In other words, the fuzzy system 10 classifies the data into one of the following categories: "stop", "city traffic", "country road (straight, curved, hilly, . . . )", "expressway" and so on.

The complete functional sequence will now be explained with reference to the data flow. Various sensor and control signals are generated in the motor vehicle 2, such as those having to do with the instantaneous speed, the position of the throttle, the engaged gear, the transverse acceleration or the engine speed. The signals are continuously recorded during the current trip and stored in the signal memory 8. These sensor signals are subsequently fed to the preprocessing module 9. Here, in addition to prefiltering and smoothing of the sensor signals, processing is performed while taking account of the chronological history of the signals. In addition, data compression over time and, by means of a combination of fusion of various sensor signals, a reduction of the dimensions are carried out. By means of the suitable fusion of various items of sensor information, for example eight sensor signals are logically combined here to form four different fusion signals. As a result of this preprocessing, on the one hand a reduction in the sampling rate is achieved and, on the other hand, a reduction in the dimensionality of the classification problem. The preprocessed sensor signals are then fed to the fuzzy system 10—also referred to as a fuzzy classification system in the following text—which, using the instantaneous input data, estimates the current driving situation, that is to say categorizes it. In the exemplary embodiment, classification is effected into five different driving situation classes. Since the block A per se forms the actual detection system which is used in the motor vehicle 2 in on-line operation to categorize the driving situation, the data flow described therefore also corresponds exactly to the sequence of the processing in the vehicle during the trip.

The partial system B generates and optimizes the fuzzy classification system in off-line operation, by using a neural network 12. This partial system is used only during the design and development phase of the circuit configuration according to the invention, and is accordingly not a constituent part of the on-line detection system in the vehicle 2. The partial system B comprises a database 13 with video recordings of measurement trips, a reference data memory 14 and the neural network 12, which in the present case is realized as a simulation computer. The two partial systems A and B are coupled by the integrated neuro-fuzzy system 6.

The signals at the output of the neural network are coupled back with a negative sign, via a data line 16, to an adder element 17 and in the latter are subtracted from the output signals from the reference data memory 14 that come in on a data line 18. The difference is input into the neural network 12. In accordance with the five driving situation classes selected here, the data lines 16 and 18 are constructed as five-fold lines. The sensor data supplied by the preprocessing module 9 pass via a (four-fold) data line 19 to a second input of the neural network 12.

The method of operation and the interplay of the two processing blocks A and B may be described as follows, with reference to the development phase: The basis for the circuit configuration 1 is formed by a fuzzy classification system which, in a first step of the development phase, is set up from available information and existing expert knowledge. In the first step, the fuzzy system is provided with a structure necessary for the classification task, such as the number of input and output variables, number of membership functions and an initial rule base. The fuzzy system later carries out the actual driving situation classification in on-line operation in the vehicle 2. In a second step, the initial fuzzy system in the integrated neuro-fuzzy system 6 is converted completely and without any loss of information into the structure of a neural network. As a result there is available in the processing block B a neural network 12 which represents the same classification system as the fuzzy system, and which has the identical input and output response. This fuzzy-neuro transformation realizes the translation of the representation of the detection system within the fuzzy domain into the neuro domain. This is a correspondence-maintaining bidirectional transformation. In other words, the topology of the neural network can at any time be converted once more into the representation as a fuzzy system.

Then, in the partial system B, with the aid of the neural network 12, a driving situation classifier contained in the fuzzy system 10 is subsequently trained, and hence the detection system is optimized in a data-driven optimization. In the process, different components of the fuzzy classifier are changed, thrown out or newly generated. The neural network is trained in off-line mode using training data, which comprises a suitable set of input data and output data of the classifier. The input data used is the recorded, preprocessed sensor data from the vehicle 2, from which the classifier determines the current driving situation. The classification result at the network output (classifier output vector) is compared with the ideal reference output vector in the learning operation. With the aid of an error e, which results from the difference between the classifier output vector and reference output vector, the neural network is trained in accordance with the known back-propagation algorithm (see, for example, S. Y. KUNG, *Digital Neural Networks*, Prentice Hall, Englewood Cliffs, N.J., 1993, p. 24–40, in particular p. 39 and R. ROJAS, *Theorie der neuronalen Netze* [The Theory of Neural Networks], Springer Verlag Berlin, Heidelberg, 1993, p. 149–172).

A "supervised" training of the classifier, carried out in this case, requires the provision of a reference data set which, in correspondence with the sensor signals recorded during a trip with the motor vehicle 2, specifies at every point in time the actual current driving situation class. To this end, during various measurement trips, in parallel with the measurement and storage of the sensor data, in addition the course of the trip is recorded using a video camera which is fitted to the motor vehicle at the front. The video recording is, for example, evaluated by a system developer and—depending on the desired number of classes—the course over time of the driving situation classes is then set up and stored as a reference data set (also referred to as a target data set or target). However, the reference data can also be made available in any other desired way. During the training, for each learning step, a sensor data combination can thus be input to the neural network 12 as an input vector (comprising 4 input values), as can the associated statement of the driving situation class as an output vector (5 classes). The training is carried out until the error e between the network output and reference falls below a prescribed error threshold.

After training is completed, and hence after to classifier is optimized, the resulting neural network is once more converted back completely into the fuzzy representation of the partial system A.

The partial system B, in which the data-driven training was carried out, is then divided off, and is no longer a constituent part of the driving situation detector implemented in the vehicle. The changes, resulting from the training of the components of the fuzzy system 10—these are the shape and position of the membership functions of input and output signals and the fuzzy rule base—can subsequently be visualized and assessed. Following subsequent evaluation in an appropriate simulation tool (such as, for example, the Siemens CAE development system which is commercially available under the name SieFuzzy), the development of the control circuit 1, which has recourse both to expert knowledge and to measured sensor data, has thus been completed and the fuzzy system 10—here also referred to as a fuzzy driving situation classification system with preprocessing—can be used in the vehicle 2 to control whichever device 5 it is set to control.

The development sequence in the neuro fuzzy system 6 is explained in summary in the following text. The individual development steps are carried out in the processing blocks which emerge from the following table.

TABLE 1

| Development step: | Processing Block |
| --- | --- |
| 1. Design of the initial fuzzy system (expert knowledge) | A |
| 2. Conversion of the fuzzy system into a neural network (fuzzy-neuro transformation) | A-B |
| 3. Training of the neural network (sensor data and video information) | B |
| 4. Conversion of the neural network back into fuzzy system (neuro-fuzzy transformation) | B-A |
| 5. Final driving situation classification in the vehicle | A |

The sensor data recorded in the vehicle are first fed to the preprocessing module or stage 9, in which the actual input signals for the fuzzy classification system are derived or calculated from the various measurement parameters. Performed in this processing step are, on the one hand, the filtering and the registration of the chronological prehistory of the sensor signals and, on the other hand, a fusion of the various measurement parameters. The following sensor signals are recorded in the vehicle 2 during the trip:

nout: Output rotational speed (proportional to driving speed)

bl: Brake light, actuation of the brake neng: Engine rotational speed a_trans: Transverse acceleration m_diff: Torque balance at transmission output, magnitude of differential torque (from this, a conclusion about uphill and downhill grades can be drawn)

gear_is: Active gear driver: Fuzzy classification of the driving style

Figure 2:
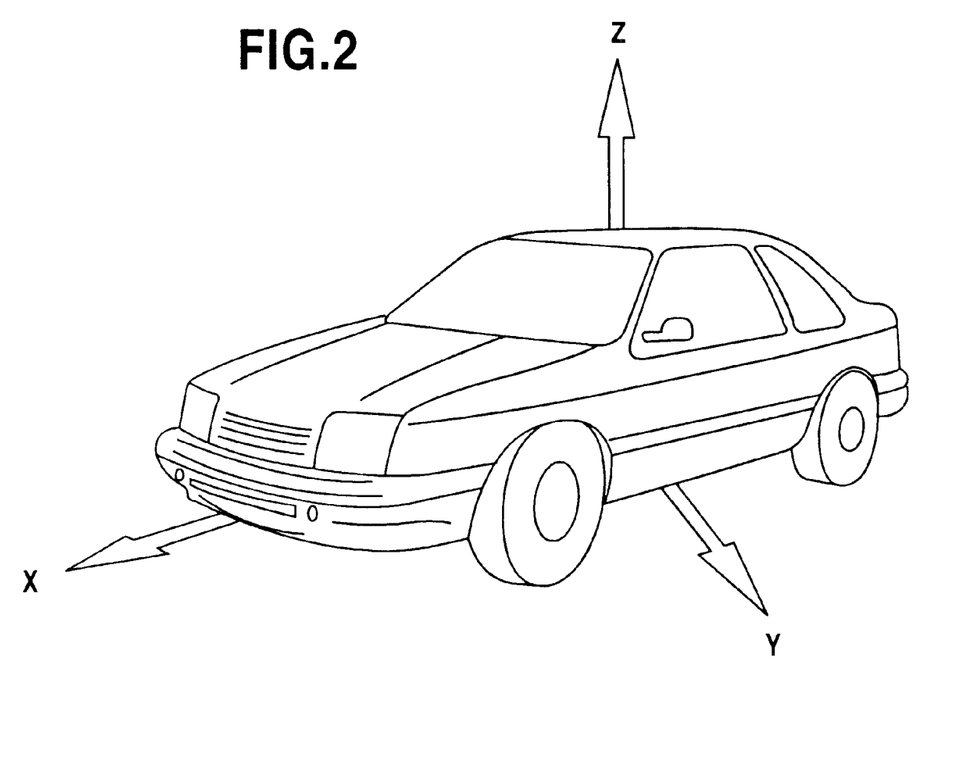
FIG. 2 is a perspective view indicating a three-dimensional illustration of a motor vehicle, to explain a fusion of sensor signals in the circuit configuration according to FIG. 1.
Figure 3:
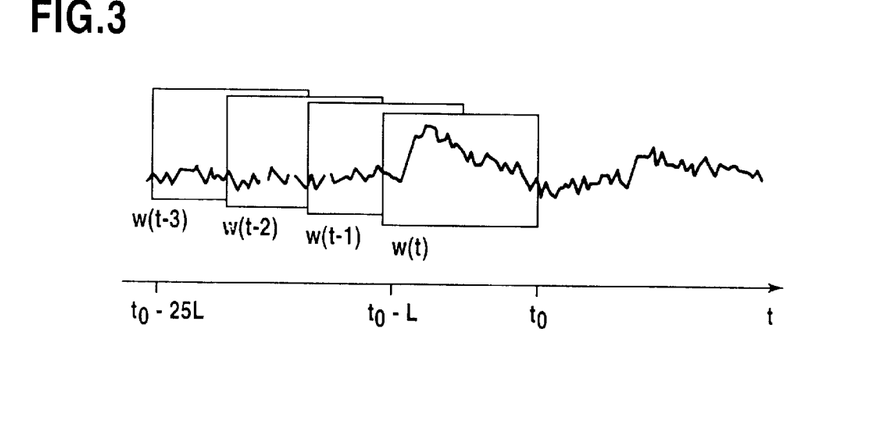
FIG. 3 is a diagrammatic illustration of time windows used in the processing of sensor signals.

In order to reduce the number of input variables necessary for the fuzzy classification system, whilst at the same time including all the measurement parameters which are available, these items of sensor data are suitably logically combined with one another and four new signals are derived therefrom. The aim of this sensor signal fusion is the description of the momentary dynamic driving state on the basis of the three three-dimensional axes x, y, z (FIG. 2), as well as using a purely speed-dependent component w. The combination of the raw signals and hence the reduction in the input dimensionality of the problem facilitates the modelling and enables the formulation of a comprehensible, clear rule base for the fuzzy classifier. The four fuzzy input variables are calculated from the eight sensor signals via the following relationships:

$x(t)=f_x\{gear\_is\ (t, t-1, t-2, t-3), neng\ (t, t-1, t-2, t-3), bl(t)\}$ $y(t)=f_y\{a\_trans\ (t, t-1, t-2, t-3), nout\ (t, t-1, t-2, t-3), driver(t)\}$ $z(t)=f_z\{m\_diff\ (t, t-1, t-2, t-3), nout\ (t, t-1, t-2, t-3), driver(t)\}$ $w(t)=f_w\{nout\ (t, t-1, t-2, t-3)\}$ The fuzzy input variable x is thus, for example, derived from the sensor data gear_is, neng and bl. The designation gear_is(t, t−1, t−2, t−3) in this case signifies that the current time window t and, in addition, the three most recent time windows t−1, t−2, t−3 enter into this calculation. The processing of the different time histories is illustrated in FIG. 3 for the purpose of clarification. In order to carry out a data compression, a time window w(t) of length L is lead over the raw signal and in each case the mean of the signal section located in the window is calculated. For the sensor signal gear_is, this mean would be described by gear_is(t).

In order to take into account the chronological history, that is to say the recent signal course, in addition to the current sensor data, the means of three mutually overlapping, recent time windows w(t−1), w(t−2), w(t−3) are concomitantly included, but with different weightings. The current value for x(t) thus results from four time windows of the sensor signal gear_is, from four time windows of the sensor signal neng and from the current time window of the sensor signal bl. After this, the time windows are set forward by one window length L.

As a result of the averaging and the advancing of the windows, considerable data compression is achieved. In an exemplary embodiment, a window length of L=250 sample values and an overlap of 50% is used. If the measured data are recorded with a sampling time of $T_{ab}$=40 ms, the result is thus a new value for x(t) every 10 s. The reaction time of the system and the time interval between two successive outputs from the driving situation classifier can be fixed by means of the window length.

Figure 4:
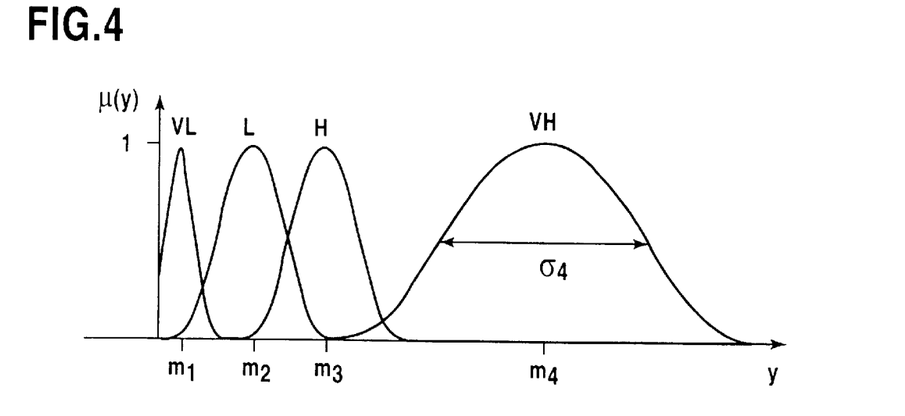
FIG. 4 is a graph showing input membership functions of a fuzzy system in FIG. 1.
Figure 5:
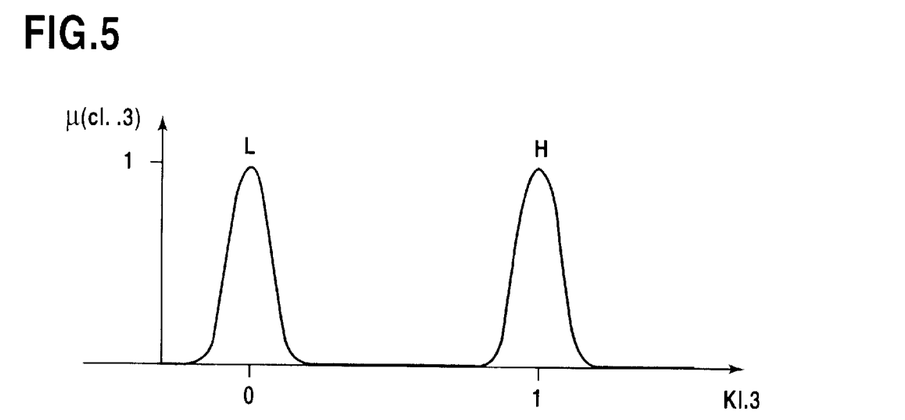
FIG. 5 is a graph showing output membership functions of the fuzzy system in FIG. 1.
Figure 6:
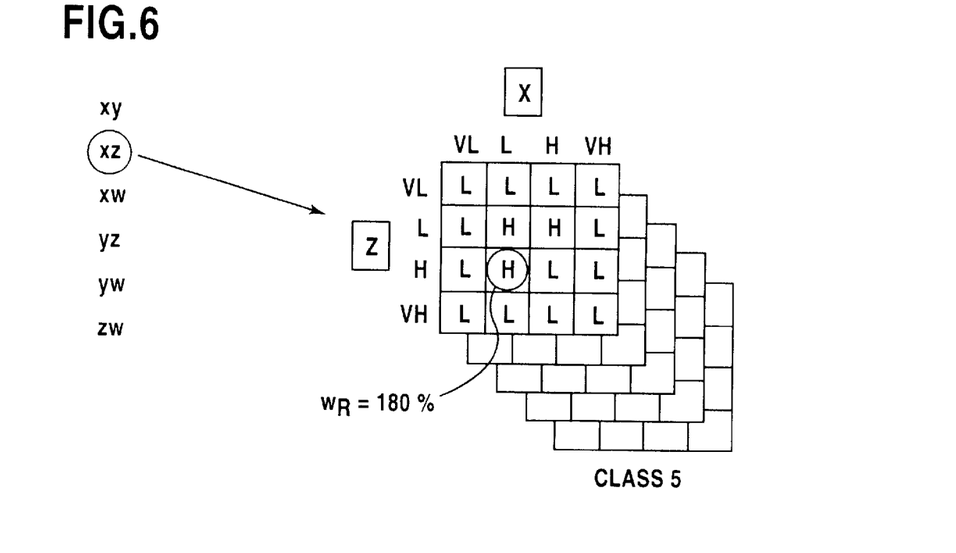
FIG. 6 shows a fuzzy rule base used in the circuit configuration according to FIG. 1.

The structure of the fuzzy system 10, which carries out the driving situation classification, is reproduced for one exemplary embodiment in FIGS. 4, 5 and 6. The input of the fuzzy system has four input parameters applied to it in this case, derived from eight different, preprocessed sensor signals. FIG. 4 shows one possible distribution of the input membership functions. The value range of each input variable is subdivided into the four membership functions VL (very low), L (low), H (high), VH (very high), and the incoming sharp input signals are appropriately fuzzified and provided with linguistic designations. In order to make the later transformation of fuzzy systems into corresponding elements of a neural network topology possible, Gauss functions are used for the membership functions. The variable parameters mean $m_i$ and width $s_i$ of the Gauss curves are represented in the neural network by corresponding weights.

The classification system has the task of making a statement about the current driving situation from the input parameters which are applied in each case. The allocation to one of five different driving situation classes is intended to be performed in this case as output variable, which can be described as follows:

Class 1: Very high speed, continuous driving situation, straight section, no excessively high transverse accelerations, no steep uphill or downhill grades (typical for highways and expressways)

Class 2: High speed, continuous driving situation, straight section, no excessively high transverse accelerations, no severe uphill or downhill grades (typical for highways and expressways)

Class 3: High/moderate speed, continuous or discontinuous driving situation, possible high transverse accelerations and/or severe uphill or downhill grades (country road, curvy, hilly, transitions between class 1 and class 2, etc.)

Class 4: Low speed, often discontinuous driving situation, high traffic density, moderate/no transverse accelerations, moderate/slight uphill or downhill grades (inner city, stop and go traffic, city perimeters and suburbs)

Class 5: Very low speed or stop (traffic signal, intersection, parking, etc.)

The structure of the fuzzy system is laid out in such a way that there is precisely one output signal for each of the five different driving situation classes (FIG. 5). Each output is equipped with only two gaussian output membership functions, one of them with a center at the output value 0 (membership function Low), the other at the output value 1 (membership function High). For each time step, there thus results from the current combination of the four input variables, as a result of the defuzzification, a five-valued output vector [Cl_1-Cl_2-Cl_3-Cl_4-Cl_5], which reproduces the instantaneous evaluations as a value between 0 and 1 for the five different driving situation classes. If, for example, an output vector [0-1-0-0-0] is output as the classification result, then this means that the driving situation was classified to 100% in Class 2, and with 0% into the other classes. By contrast, in the case of an output [0.0-0.0-0.1-0.2-0.7], the current situation was classified with a different value into all the classes, but most highly into the classes 4 (at 20%) and 5 (at 70%).

The input and output variables are logically combined with one another via the fuzzy rule base of the fuzzy system 10. Here, the available expert knowledge is formulated linguistically. In an exemplary embodiment, the rule base is laid out with a system that can be seen from FIG. 6. Using the four input variables of the fuzzy system—here designated by x,y,z,w—all six possible pairs of permutations are formed, i.e., xy, xz, xw, yz, yw, zw. For each of these input pairs, one control matrix is covered. In the figure, by way of example, such a control matrix is reproduced for the input combination xz. Since the two input variables x and z are in each case fuzzified using the four membership functions VL, L, H, VH, the result here for the complete rule base is a 4×4 matrix. The output membership functions are entered as the sixteen matrix elements belonging to the respective linguistic combination of the fuzzified input variables, of the corresponding fuzzy rule. The element identified in the figure in the uppermost matrix therefore stands, for example, for the rule:

$R_{xz,23}$: IF x is Low AND z is High THEN Cl_1 is High

The matrix entry, here H for High, thus denotes the fuzzy conclusion for the output Cl_1 (Class 1), which results in accordance with the rule from the AND combination of the partial premises x=Low and z=High. The remaining elements of this matrix result in similar fashion from the rule base for all the AND combinations of x and z. As indicated, the rule base in this illustration has a depth of five for the five different output variables Cl_1, Cl_2, Cl_3, Cl_4 and Cl_5. Each matrix plane therefore describes the conclusions of the various rules with respect to a single output, the uppermost matrix for the output Cl_1 and the lowest matrix for the output Cl_5. The complete fuzzy rule for the case described above is therefore, for example:

$R_{xz,23}$: IF x is Low AND z is High THEN Cl_1 is High and Cl_2 is Low and Cl_3 is Low and Cl_4 is Low and Cl_5 is Low.

Each rule always makes a statement for all the output variables. As a result of the systematic setting up of the rules, one obtains in each case 4×4=16 rules for each of the six possible paired permutations, and this results in a complete rule base with 96 rules (6 permutations each having 16 rules).

An initial rule base, which comprises seven rules Rule 1 to Rule 7, is reproduced below:

Rule 1
IF (INPUT2_Y IS LOW) AND (INPUT4_W IS VL) THEN
  CLASS5=HIGH
  CLASS4=LOW
  CLASS3=LOW
  CLASS2=LOW
  CLASS1=LOW
Rule2
IF (INPUT2_Y IS VL) AND (INPUT4_W IS LOW) THEN
  CLASS5=LOW
  CLASS4=HIGH
  CLASS3=LOW
  CLASS2=LOW
  CLASS1=LOW
Rule3
IF (INPUT2_Y IS LOW) AP (INPUT4_W IS VL) THEN
  CLASS5=LOW
  CLASS4=LOW
  CLASS3=LOW
  CLASS2=LOW
  CLASS1=LOW
Rule4
IF (INPUT2_Y IS LOW) AND (INPUT4_W IS LOW) THEN
  CLASS5=LOW
  CLASS4=HIGH
  CLASS3=LOW
  CLASS2=LOW
  CLASS1=LOW
Rule5
IF (INPUT2_Y IS HIGH) AND (INPUT4_W IS VL) THEN
  CLASS5=LOW
  CLASS4=LOW
  CLASS3=LOW
  CLASS2=LOW
  CLASS1=LOW
Rule6
IF (INPUT2_Y IS HIGH) AND (INPUT4_W IS LOW) THEN
  CLASS5=LOW
  CLASS4=HIGH
  CLASS3=LOW
  CLASS2=LOW
  Class1=LOW
Rule7
IF (INPUT2_Y IS VH) AND (INPUT4_W IS VL) THEN
  CLASS5=LOW
  CLASS4=LOW
  CLASS3=LOW
  CLASS2=LOW
  Class1=LOW The topology of the neuro-fuzzy system 6 results from the following considerations: Following the design of the initial fuzzy classification system, it is converted completely and without loss into the structure of a neural network, in order to carry out the data-driven optimization. Generated in this way is a neural network which represents the same classification system as the fuzzy system, and which has an identical input and output response. The fuzzy-neuro transformation enables the translation from the representation or illustration of the detection system as a fuzzy system into the representation as a neural network. This is a correspondence-maintaining bidirectional transformation, that is to say the topology of the neural network, following the completion of the learning phase, can be converted once more into the representation as a fuzzy system.

For the purpose of the functionally equivalent conversion of a fuzzy model into a neural topology, the individual processing stages—fuzzification, rule base, and defuzzification—are projected onto corresponding partial structures of a neural network. One important boundary condition here is the use of available neuro components and the applicability of tried and tested (for example known from the textbook mentioned) learning and adaptation algorithms. In spite of the restriction to simple neuron types, however, a specific network structure enables the complete projection of all the operations of a fuzzy model, which is to be described in detail in the following text.

Figure 7:
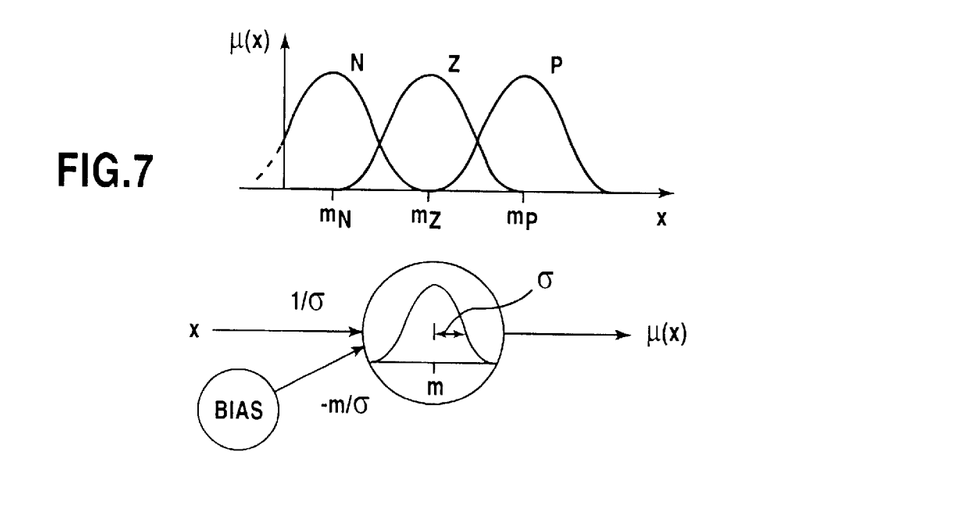
FIG. 7 is a graphical illustration of a fuzzification carried out in FIG. 1.

The conversion of the fuzzification is realized by a first layer of neurons having activation functions similar to RBF functions (RBF=radial base functions). For each membership function of an input variable there exists a neuron at whose input in each case only two signals are summed: the current sharp input value and the mean of the membership function (FIG. 7). The resulting value is then weighted via a gaussian activation function and output. At the output of a single fuzzification neuron, the result is a corresponding degree of membership $\mu_k(x_i)$:

$$\mu_k(x_i) = \exp\left[-\left(\frac{x_i - m_k}{\sigma_k}\right)^2\right]$$

where $x_i$ denotes the current input signal, $m_k$ the mean and $\sigma_k$ the width of the gaussian input membership function k. The mean value $m_k$ is defined via a corresponding weight and a constant input "bias" for the respective neuron. The width of the membership functions is set by weighting both the inputs with/$\sigma_k$.

A control neuron (FIG. 8) is constituted as follows. The rule base of the fuzzy system 10, that is to say the execution of its inference part is realized by a layer of control neurons, in which all the rules present are evaluated simultaneously. The number of neurons corresponds to the number of rules present. In the topology realized, rules of the following type can be imaged:

simple rules with only one fuzzy variable in the premise
  rules with a premise part in which a plurality of fuzzy variables are combined conjunctively (AND rules)

Figure 8:
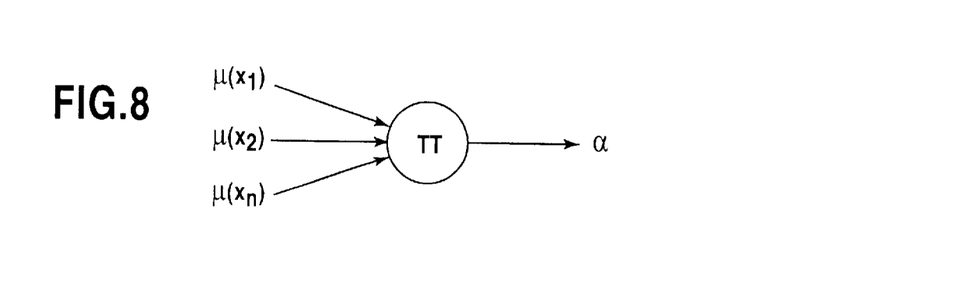
FIG. 8 is a diagrammatic view of a control neuron of a neural network in FIG. 1.

The conclusion part may contain either one or more output variables. The AND logical combining of two fuzzy variables in the premise part is realized in the fuzzy-neuro network by the product of these variables (cf. FIG. 8). In order to be able to execute this multiplicative operation, which is necessary for the conjunctive logical combination, using standard neurons, the inference is formed in two stages in the implemented topology. If the gaussian activation function is realized not in one but in two successive network layers, then the calculation of the product can at the same time be reduced to a simple summation. The result is thus, at the output of the individual control neurons for the respective premise a of the rule j:

$$\alpha_j = \prod_{k=1}^{n_{mbf}} \mu_k(x_i) = \prod_{k=1}^{n_{mbf}} \exp\left[-\left(\frac{x_i - m_k}{\sigma_k}\right)^2\right] = \exp\left[\sum_{k=1}^{n_{mbf}} \left(\frac{x_i}{\sigma_k} - \frac{m_k}{\sigma_k}\right)^2\right]$$

The calculation of the Gauss function, which is necessary for the determination of the memberships, is not executed solely in the fuzzification layer but in combination with the subsequent control layer. A quadratic activation function, $f(x)=x^2$ is used in the neurons of the first layer, and an exponential activation function, $f(x)=\exp(x)$ is used in the control neurons. Consequently, the values for the degree of membership $\mu_i$ are not explicitly available following the fuzzification layer, but go directly into the calculation of the conclusions $\alpha_j$. The advantage of this arrangement lies firstly in the avoidance of a "product neuron," for which an appropriate adaptation algorithm would additionally have to be defined, and secondly in obtaining the network structure necessary for the correspondence with the fuzzy system.

As a result of the multiplicative logical combining of the partial premises, executed in the first two hidden layers, the premises of the rules are processed. The numerical value $\alpha_j$ resulting at the output of the control neuron represents the evaluation of the IF part of a rule. This value is subsequently fed to a further neuron, which reproduces the fuzzy variable of the output signal. Hence, the conclusion part of the rule is imaged. Here, the number of neurons corresponds to the total number of all the output membership functions. These neurons carry out a simple summation of all the conclusions of the rules which "fire", that is to say become effective, for a specific fuzzy output variable. Here, therefore, the identity $f(x)=x$ is used as the activation function.

Defuzzification in the fuzzy system 10 for calculating the output values of the fuzzy system uses a standard defuzzification method with Maxdot inference and subsequent calculation of the center of gravity over the sum of all the firing output membership functions. From the various conclusions $\alpha_j$ the result is thus, for an output value y.

$$y = \frac{\sum_{k=1}^{n_{ombf}} M_k \cdot \sum_{j=1}^{n_T} (w_{kj} \cdot \alpha_j)}{\sum_{k=1}^{n_{ombf}} A_k \cdot \sum_{j=1}^{n_T} (w_{kj} \cdot \alpha_j)} \text{ with}$$

$w_{kj} = 1$ if partial conclusion in rule $w_{kj} = 0$ otherwise where $M_k$ denotes the individual moments and $A_k$ the areas of the respective output membership functions. A defuzzification in accordance with the area center of gravity method (also center of sums) permits the prior calculation of the areas and moments as early as during the prestructuring of the network, and simple representation by two numerical values during the adaptation phase. It is not necessary for any explicit evaluation of the respectively resulting areas of the output membership functions to be performed. In the topology, $M_k$ and $A_k$ are realized by appropriate weighting factors. Thus, a scaling is performed of the individual moments and individual areas using the α-value, which results from the superposition of all the firing rules. The quotient is subsequently calculated from the sum of all the moments and the sum of all the areas. Since the division cannot be realized in a single neuron, the calculation is reduced to a subtraction by taking logarithms and subsequent exponentiation:

$$y = \exp\left[\ln\left(\sum_{k=1}^{n_{ombf}} M_k \cdot \sum_{j=1}^{n_T} (w_{kj} \cdot \alpha_j)\right) - \ln\left(\sum_{k=1}^{n_{ombf}} A_k \cdot \sum_{j=1}^{n_T} (w_{kj} \cdot \alpha_j)\right)\right] \quad (1)$$

With this, the calculation of the sharp output value from the combination of the fuzzy variables is converted.

Figure 9:
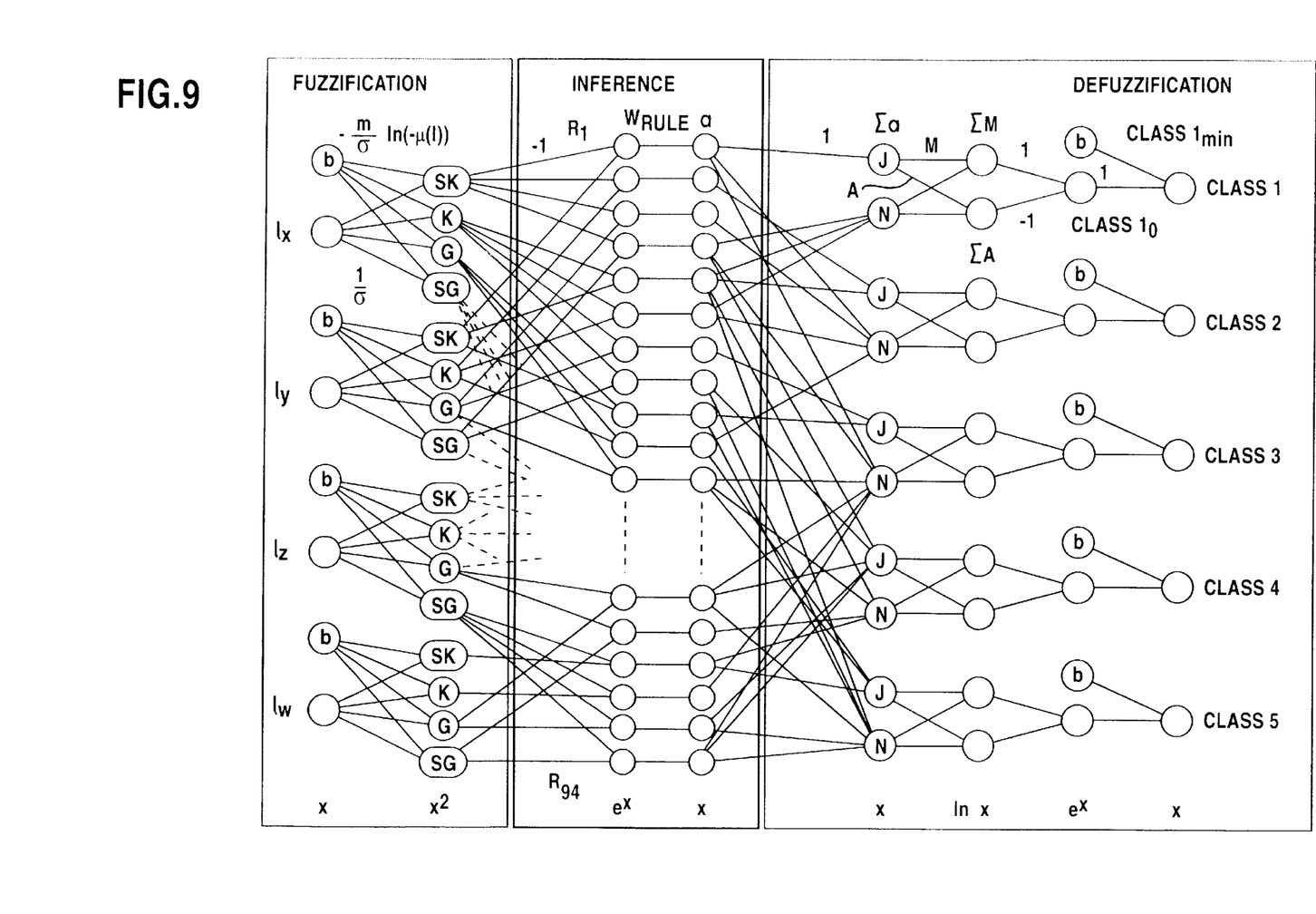
FIG. 9 is a schematic view of a fuzzy-neuro topology of the circuit configuration of FIG. 1.

A schematic overview of the complete neural topology realized for the neuro-fuzzy system 6 can be seen from FIG. 9. The structure illustrated is based on the fuzzy classification system having four input variables x, y, z and w, the five output variables Class 1–Class 5 and a rule base having 96 rules. It is possible to see the three essential partial structures for the fuzzification, the rule base and the defuzzification. The model corresponds to a forward-driven neural network with eight layers, only three layers being responsible for the functionally equivalent conversion of the defuzzification operation. The operations carried out in the individual layers are indicated in the lowest line of FIG. 9.

The neuro-fuzzy architecture represents a complete imaging of the fundamental fuzzy model. The four input signals $l_x$, $l_y$, $l_z$, and $l_w$ are fuzzified in the second and third layer. In this case, the fixing of the number, the shape and position of the input membership functions and the allocation to the corresponding variables, take place in the neurons of the second layer. The inputs are each fuzzified using the four membership functions VS, S, L, VL (very small, small, large, very large), this resulting in a layer with sixteen neurons. Then, in the third layer, the individual rules $R_1$ to $R_{96}$ of the rule base are converted. For each rule there now exists a corresponding rule neuron, at whose input appropriate partial premises are present. These partial premises are logically combined with one another as described, and a rule activation degree a is calculated, which is also multiplied by a rule weight $W_{Rule}$. This rule activation degree α is subsequently allocated to the membership functions of the individual output variables Class 1–Class 5 via the partial conclusions. The partial conclusions resulting in this way in layer 5 for one output variable are subsequently combined in the defuzzification part. Between the layers 5 and 6, the conclusions are weighted with the previously calculated areas $A_k$ and moments $M_k$ belonging to an output membership function. In the layers 6 and 7, finally, the quotients of moments and areas are calculated by taking logarithms and subtracting the arguments.

In the following Table 2, the most important parameters of different fuzzy systems for the driving situation detection, and the corresponding classification results, are indicated for one exemplary embodiment. The results are listed for a representative measurement trip, which contains the five different driving situation classes in approximately equal proportions. Sensor data for a driving time of 32 min were evaluated; at a sampling rate of 40 ms this corresponds to 48,000 sample values.

TABLE 2

| system | learned parameters | | | | # rules | # IM | J | C/W/N | C/W/N % |
|---|---|---|---|---|---|---|---|---|---|
| | IM | OM | RW | C | | | | | |
| initial | − | − | − | − | 96 | 16 | 0.058 | 106/11/75 | 55/6/39 |
| man.opt. | − | − | − | − | 96 | 16 | 0.057 | 142/11/39 | 74/6/20 |
| lrn_mbf | + | − | − | − | 96 | 16 | 0.033 | 159/9/24 | 82/5/13 |
| lrn_rw_mbf | + | − | + | − | 44 | 16 | 0.016 | 179/6/7 | 93/3/4 |
| lrn_all | + | − | + | + | 85 | 16 | 0.013 | 181/4/7 | 94/2/4 |
| rule_red | + | − | + | − | 20 | 13 | 0.021 | 179/12/1 | 93/6/1 |

As a result of the formation of time windows with a window length of L=250 sample values, a total of 192 classification outputs (48,000/250, a classification output every 10 seconds) results for the trip duration. Reading from left to right, the table contains the following statements: the designation of the respective classification system, statements as to which parameters of the fuzzy system were trained in the neural network (IM=input membership functions, OM=output membership functions, RW=rule weights, C=conclusions), the size of the fuzzy rule base, the number of input membership functions, the mean square error relating to the target data set and the classification result as an absolute value and percentage (C/W/N—Correct/Wrong/Not classified).

The initial fuzzy system, which was set up solely using expert knowledge, classifies the instantaneous driving situation correctly in 106 out of 192 cases (55%), incorrectly in 11 cases (6%) and makes no statement in 75 cases (39%). The manually optimized system reaches a proportion of 74% with respect to the correctly classified situations. Different results are yielded for the trained detection systems, depending on the number of parameters enabled in the neural network. In this case, the available sample data was in each case subdivided into a training set and generalization set in the ratio 7:3. The results show that, with a reduced development effort, the data-driven optimization allows a considerable increase in the detection rate to be achieved. Thus, for example, with a reduced rule base of 85 rules, a classification result of 94% "correct", 2% "wrong" and 4% "not classified" is achieved.

We claim:

1. A circuit configuration for controlling a system device in a motor vehicle, comprising:

a fuzzy system receiving sensor signals from a motor vehicle, said fuzzy system being programmed to evaluate the sensor signals, to determine a driving situation, to generate, during a driving operation of the motor vehicle, signals classifying a respective driving situation, and to generate driving-situation-dependent control signals for a system device in the motor vehicle;

a neural network connected to said fuzzy system, said neural network being programmed to evaluate the sensor signals and reference data from a recording of driving data of the motor vehicle, said neural network generating and optimizing said fuzzy system; and a preprocessing circuit connected to said fuzzy system, said preprocessing circuit filtering and smoothing the sensor signals and/or control signals prior to an evaluation thereof in said fuzzy system, and wherein a linkage effects a dimensional reduction of the sensor signals.

2. The circuit configuration according to claim 1, which further comprises a signal memory connected to said fuzzy system, said signal memory storing sensor signals prior to an evaluation thereof by said fuzzy system.

3. The circuit configuration according to claim 1, which further comprises a signal memory connected to said fuzzy system, said signal memory storing the control signals.

4. The circuit configuration according claim 1, which further comprises a database storing video recordings of measurement trips taken by the motor vehicle, and a reference data memory through which data contained in said database are delivered to said neural network.

5. The circuit configuration according to claim 1, wherein said neural network is further programmed to adapt a form and location of membership functions of input and output data, and a rule base of said fuzzy system.

6. The circuit configuration according to claim 1, wherein said fuzzy system and said neural network have functionally equivalent, respective input and output behavior.

7. The circuit configuration according to claim 1, wherein each of said fuzzy system and said neural network has a classification system, and the classification system of one is convertible into the classification system of another by a correspondence-maintaining bidirectional transformation.

* * * * *